14 Sheets--Sheet 7.
G. DUNHAM.
Machines for Making Paper-Bags.
No. 141,862. Patented August 19, 1873.
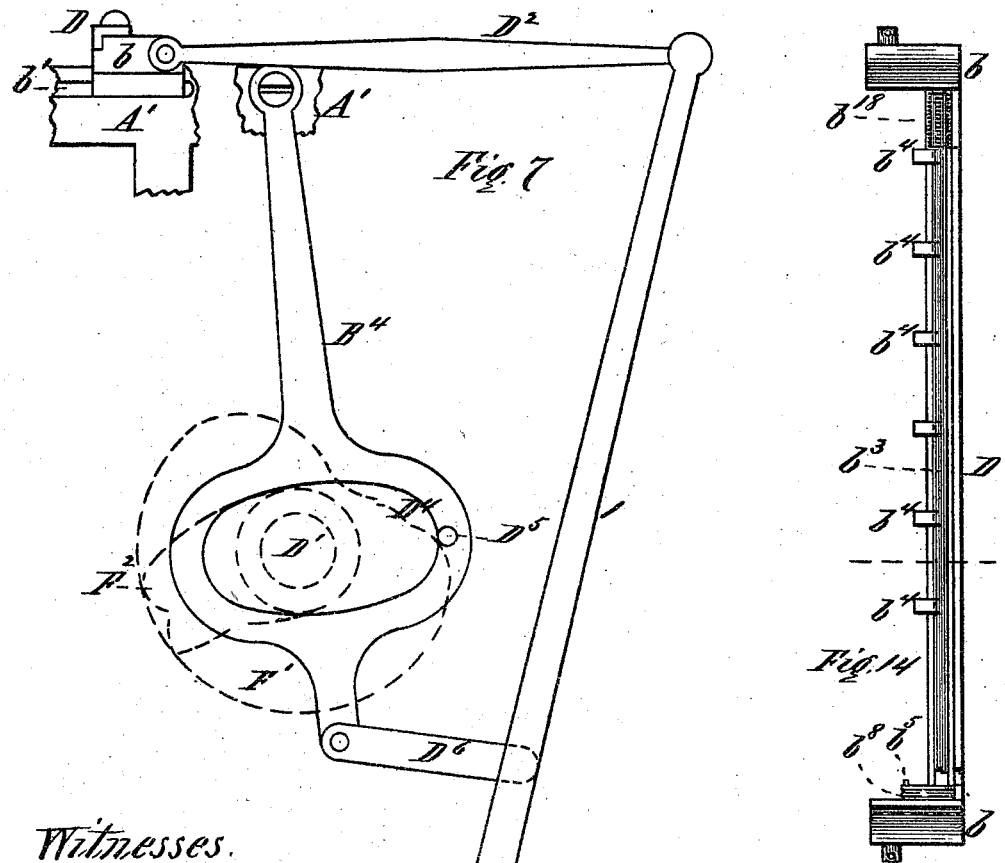
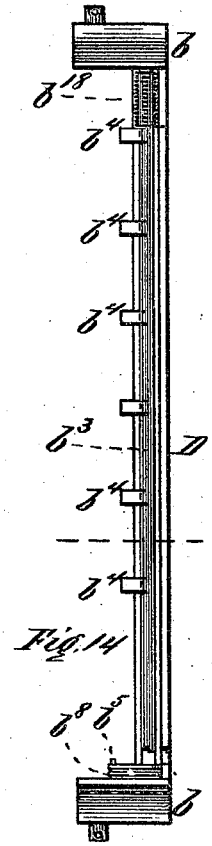
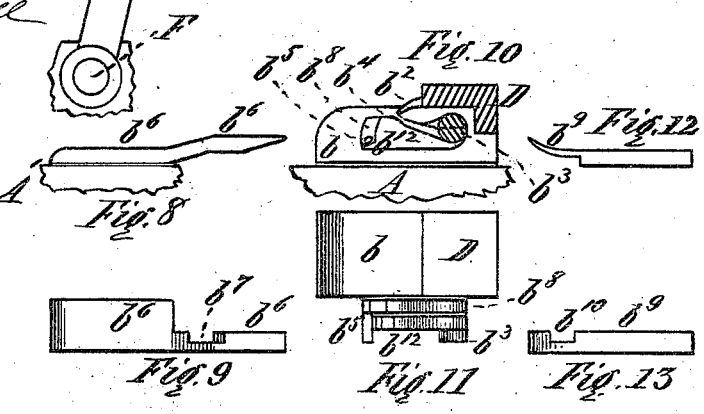

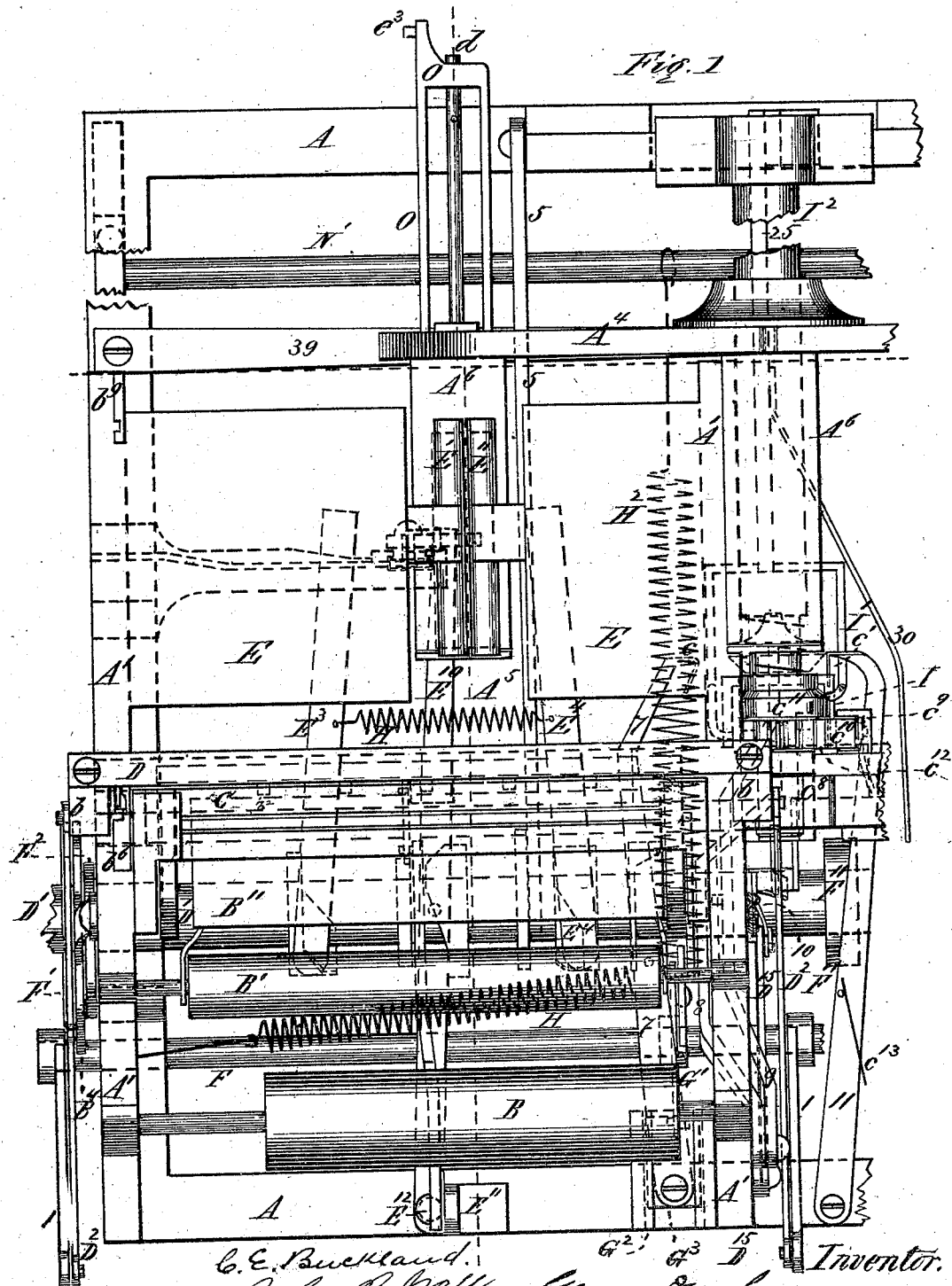

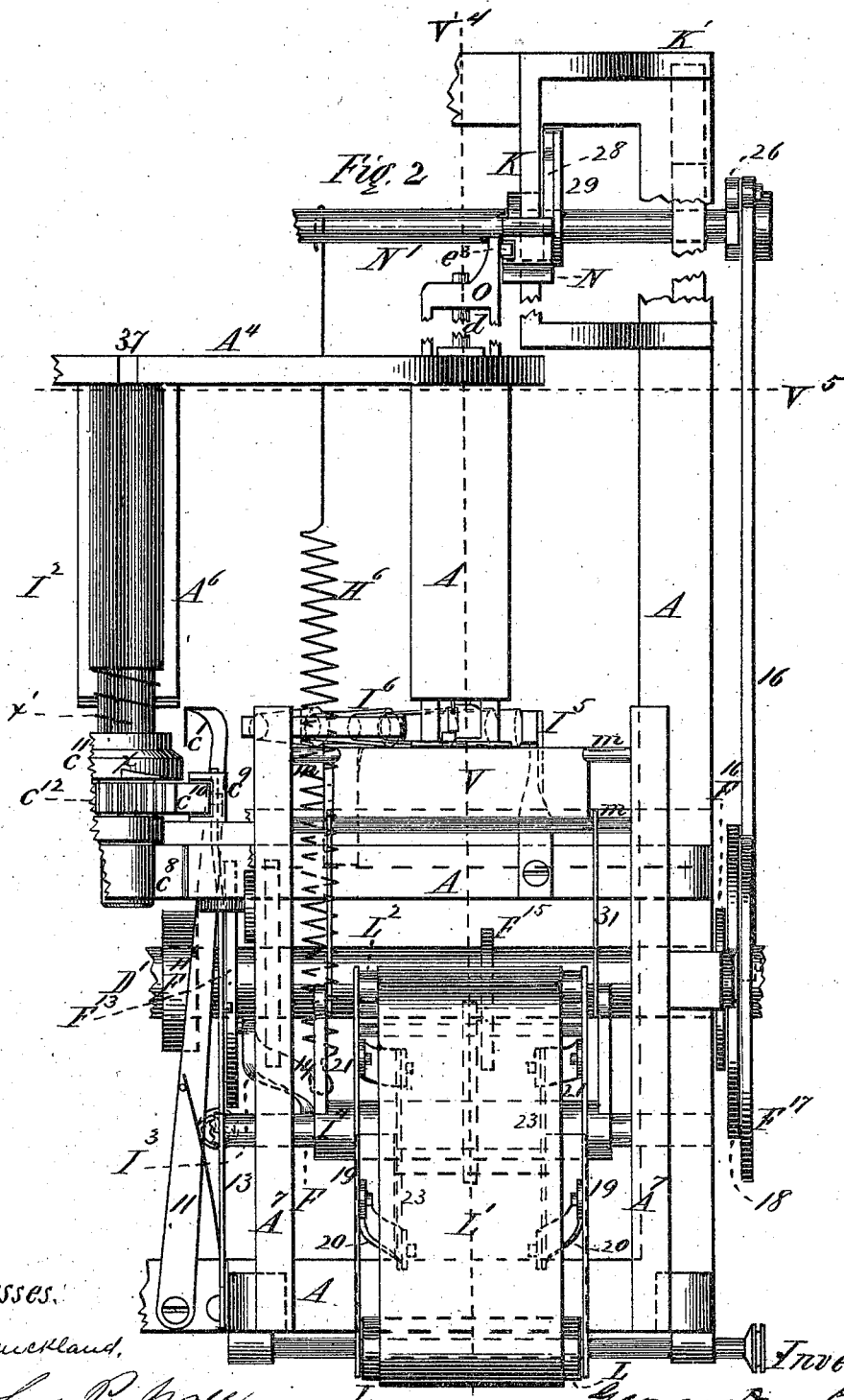

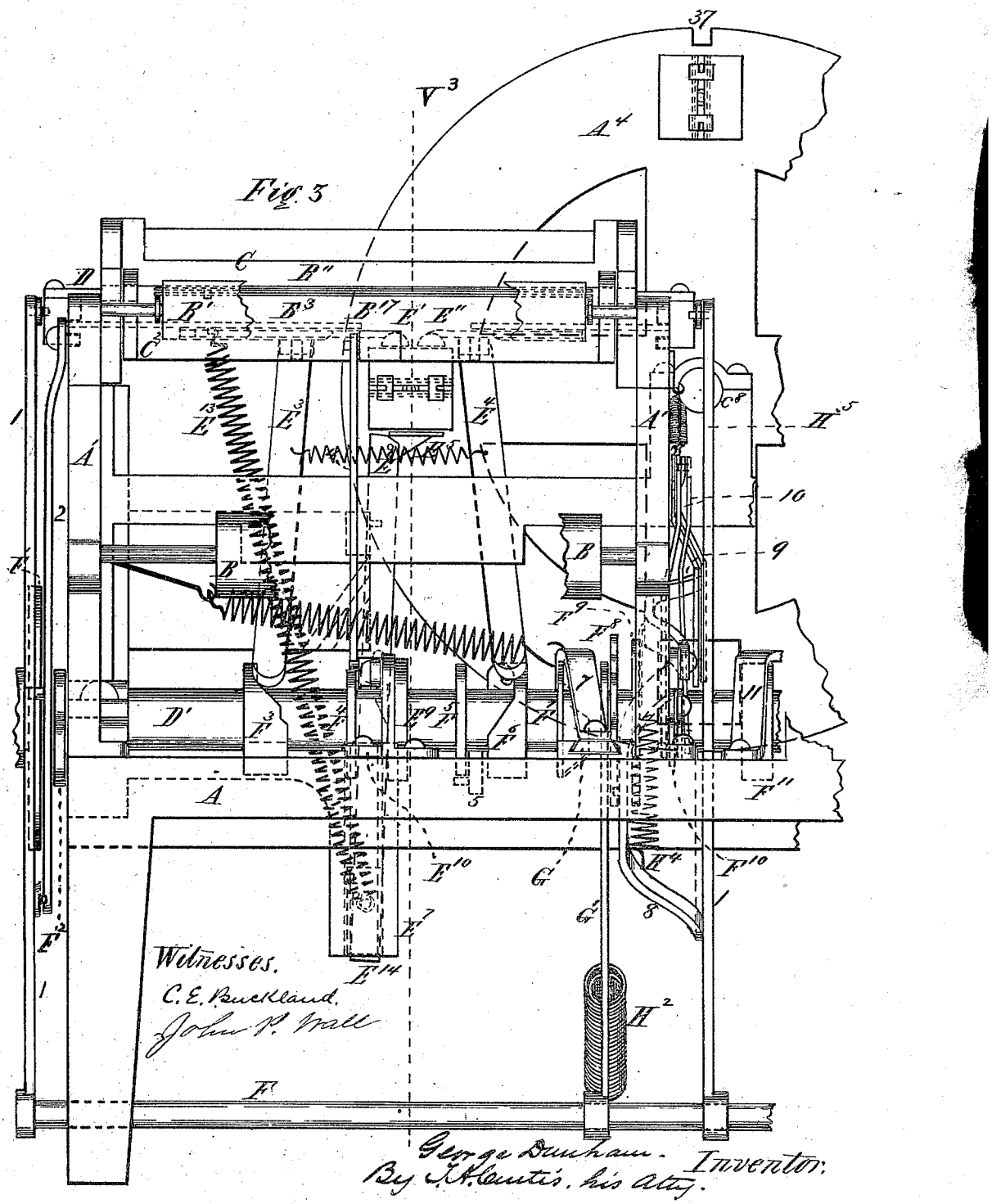

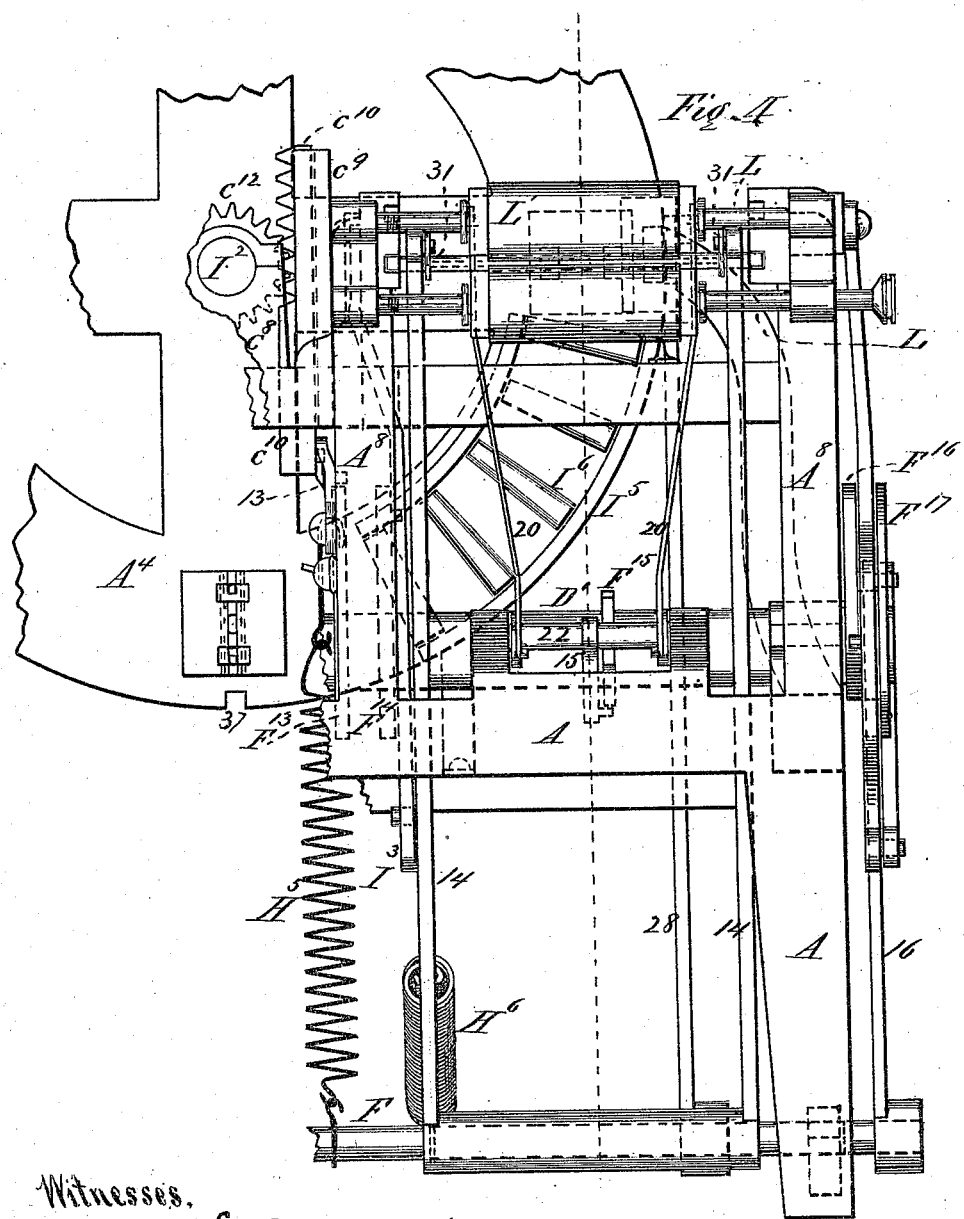

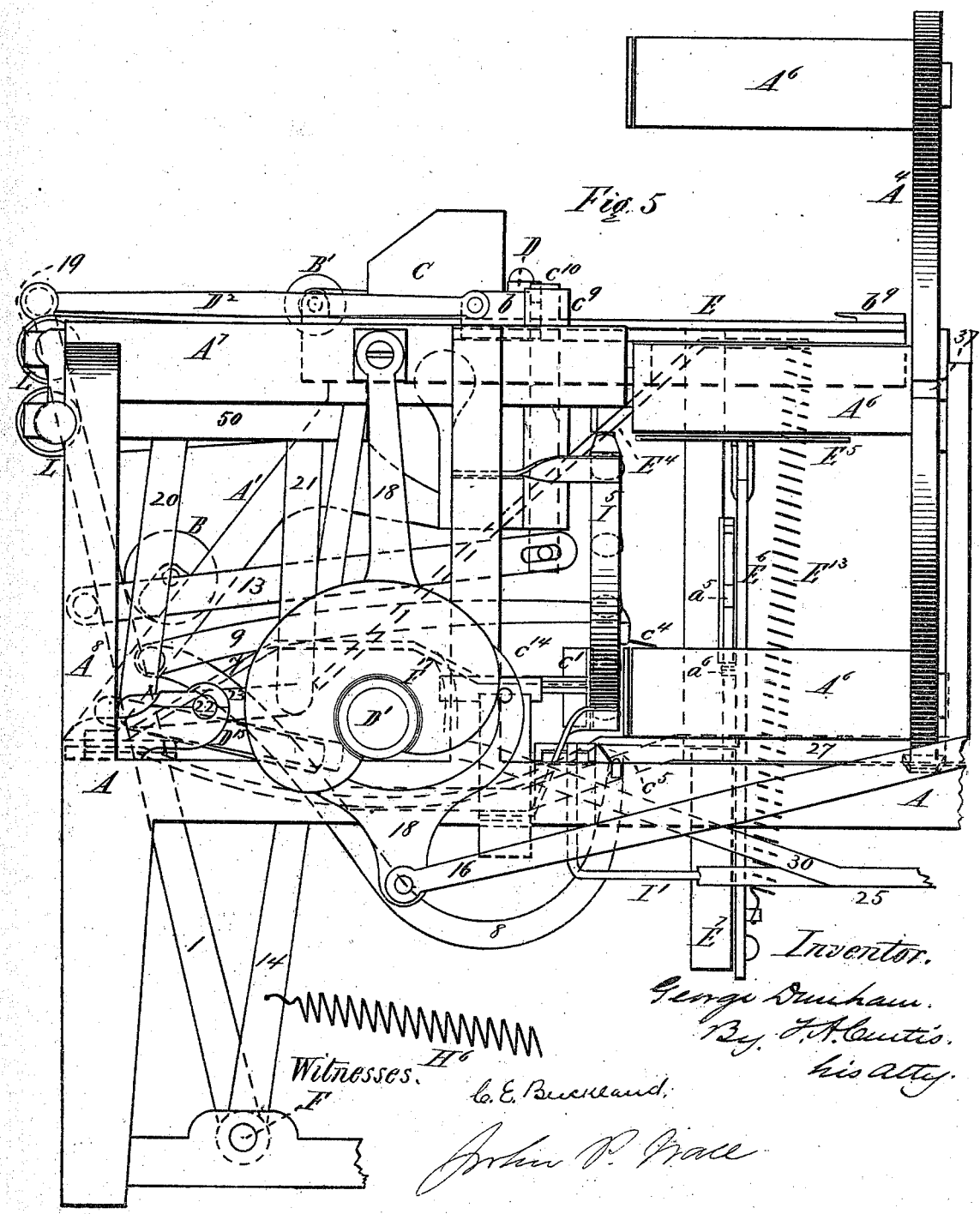

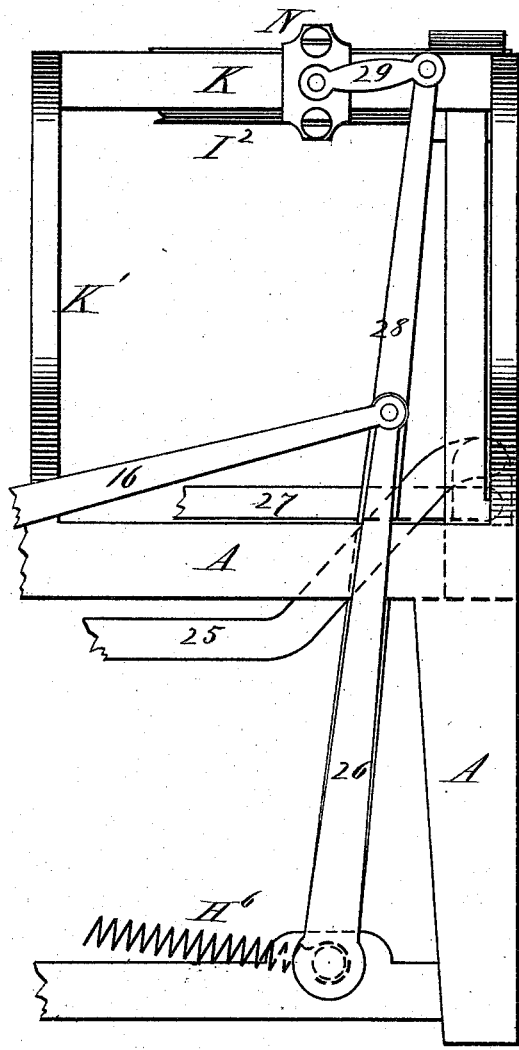

G. DUNHAM.
Machines for Making Paper-Bags.

No. 141,862. Patented August 19, 1873.

Witnesses,
Clarence E. Buckland
John P. Noll

Inventor,
George Dunham
By J. N. Curtis, his atty.

G. DUNHAM.
Machines for Making Paper-Bags.
No. 141,862. Patented August 19, 1873.
14 Sheets--Sheet 9.
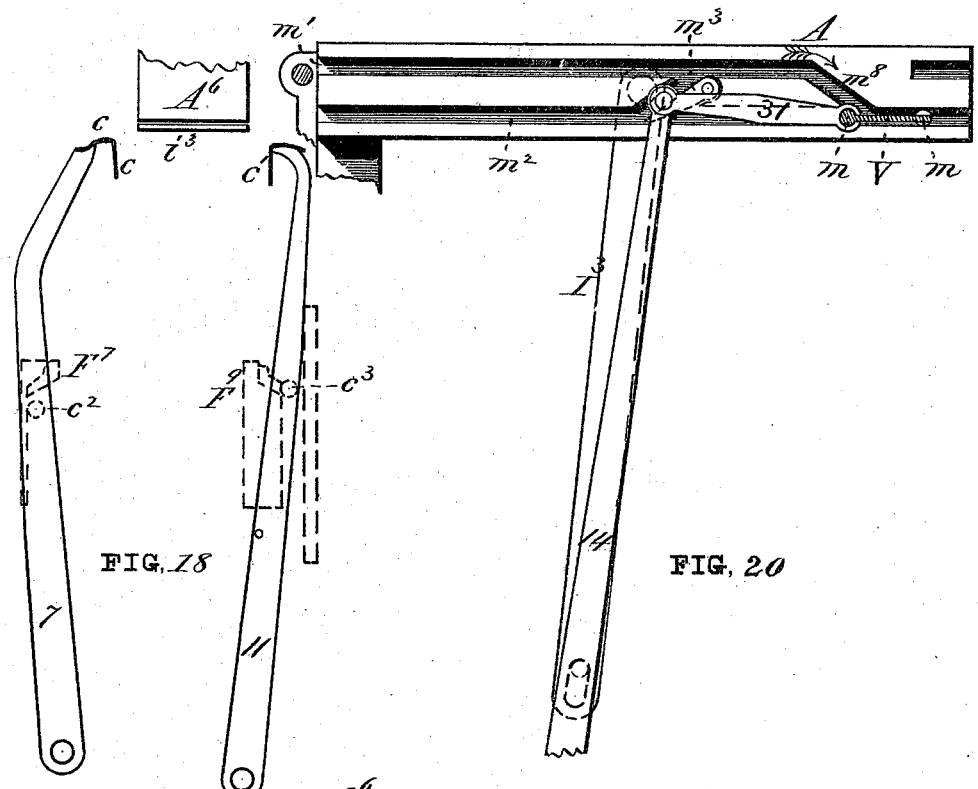
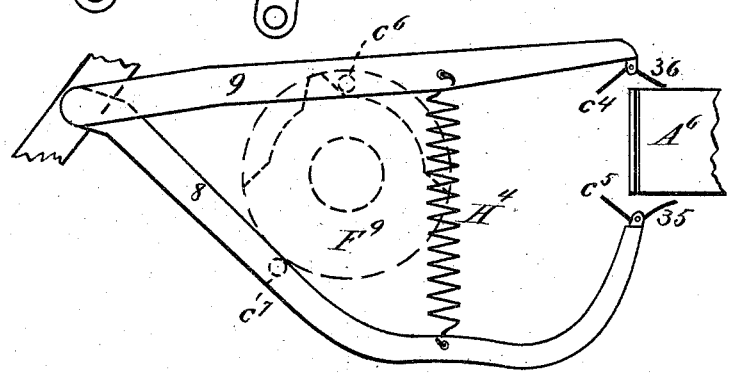
Witnesses,
Clarence E. Buckland.
John P. Wall
Inventor,
George Dunham.
By F. A. Curtis
his atty.

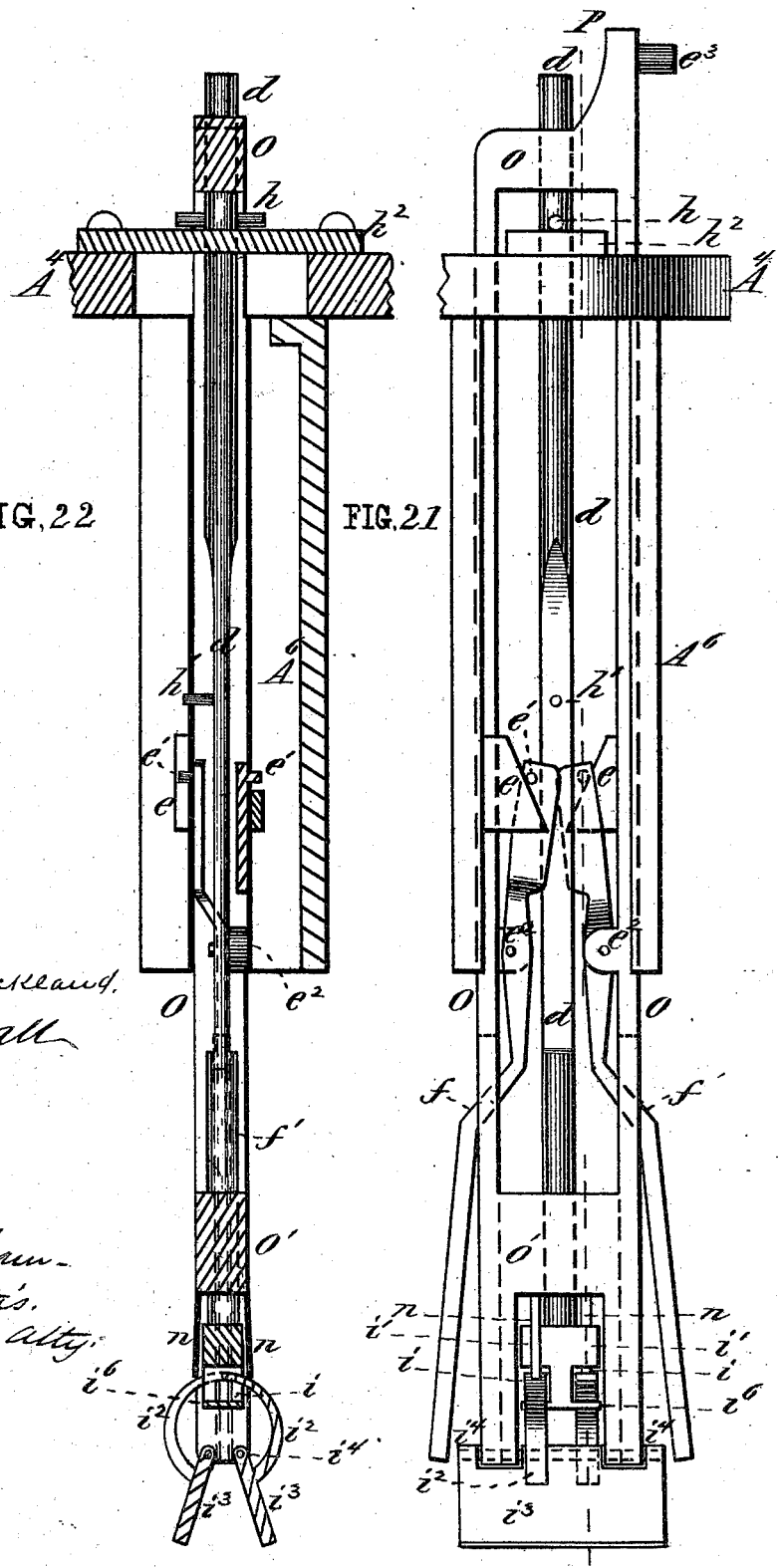

14 Sheets--Sheet 11.

G. DUNHAM.
Machines for Making Paper-Bags.

No. 141,862. Patented August 19, 1873.

Witnesses, George Dunham, Inventor,
Clarence E. Buckland, By J.A. Curtis,
John P. Wall his atty.

AM. PHOTO-LITHOGRAPHIC CO. N.Y. (OSBORNE'S PROCESS.)

14 Sheets--Sheet 12.

G. DUNHAM.
Machines for Making Paper-Bags.

No. 141,862. Patented August 19, 1873.

Witnesses,
Clarence E. Buckland.
John P. Wall

Inventor,
George Dunham.
By T. A. Curtis, his atty.

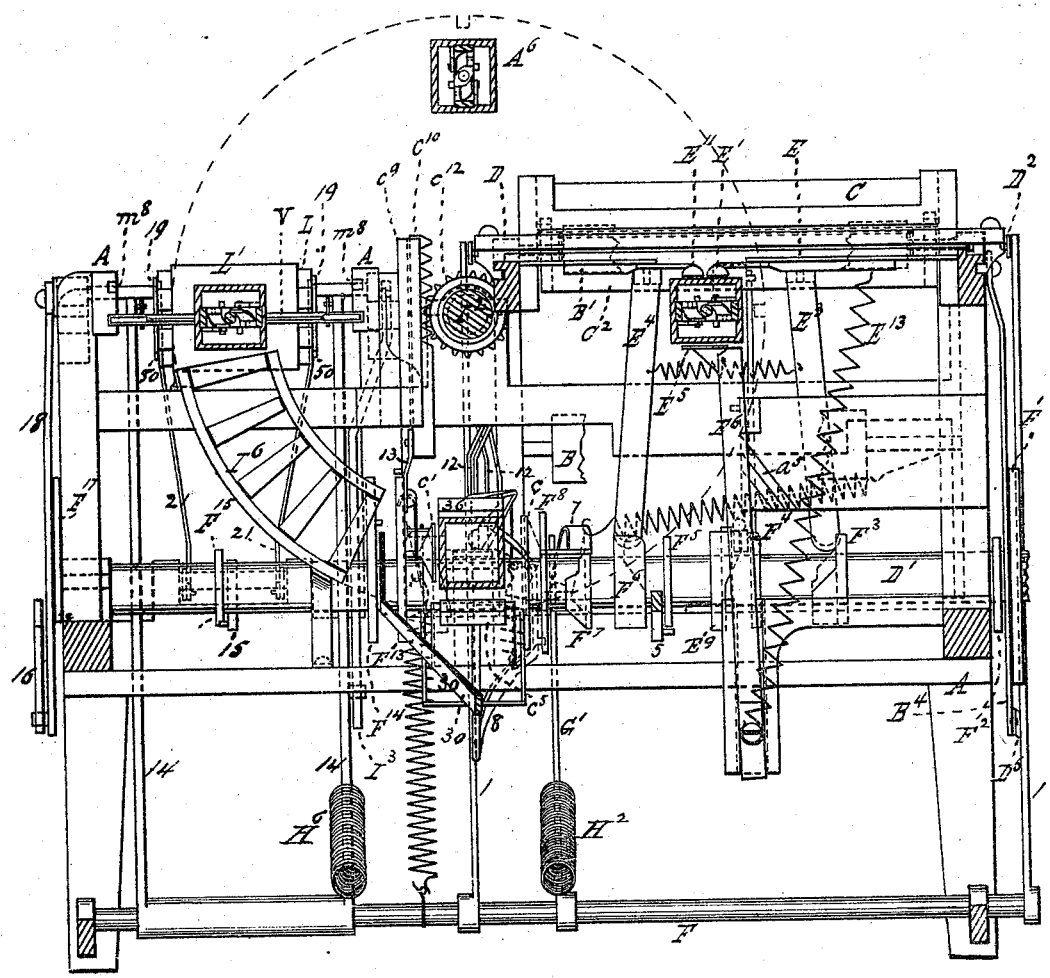

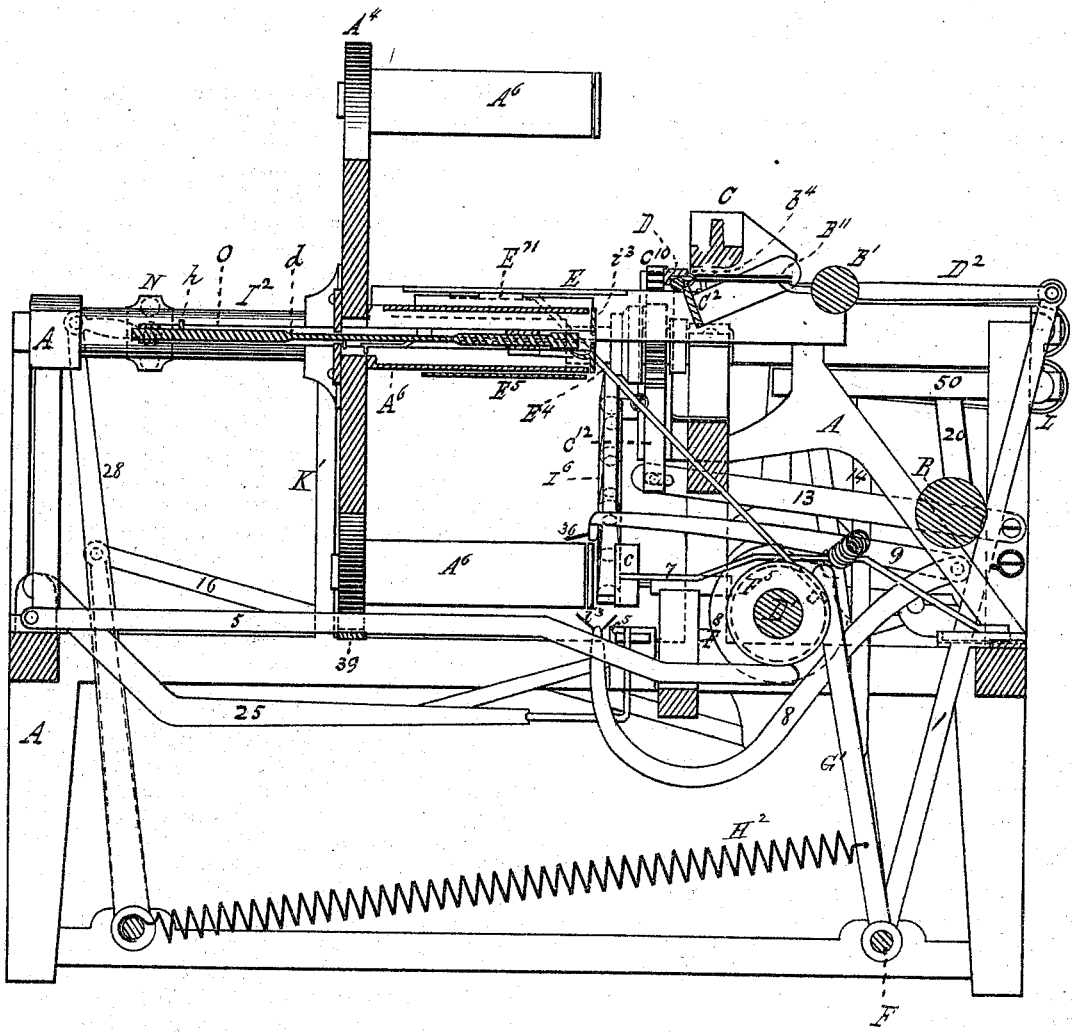

UNITED STATES PATENT OFFICE.

GEORGE DUNHAM, OF UNIONVILLE, CONNECTICUT.

IMPROVEMENT IN MACHINES FOR MAKING PAPER BAGS.

Specification forming part of Letters Patent No. 141,862, dated August 19, 1873; application filed December 2, 1872.

*To all whom it may concern:*

Be it known that I, GEORGE DUNHAM, of Unionville, in the county of Hartford and State of Connecticut, have invented a new and useful Machine for Making Paper Bags; and I do hereby declare that the following is a full, clear, and exact description thereof, reference being had to the accompanying drawings making a part of this specification, and to the letters and figures marked thereon, in which—

Figure 17:
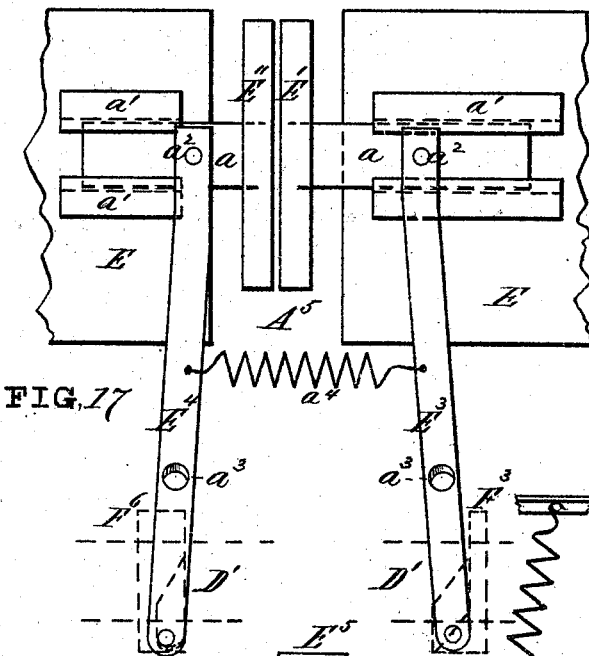
Figure 16:
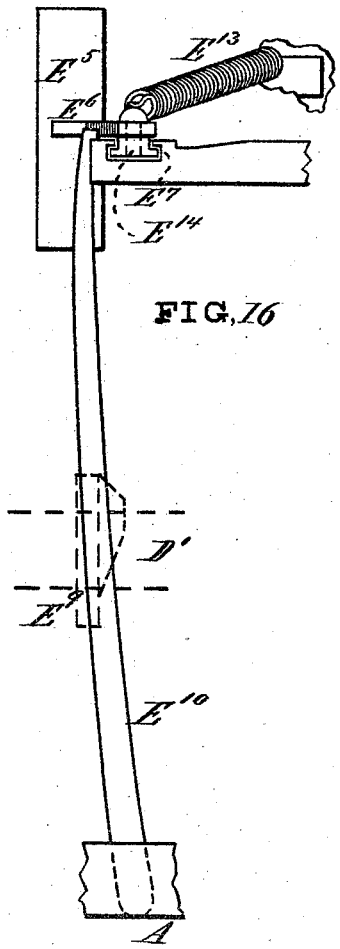
Figure 15:
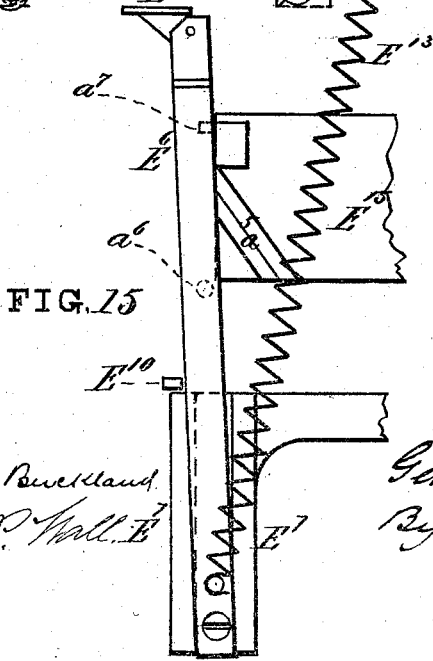
Figure 23:
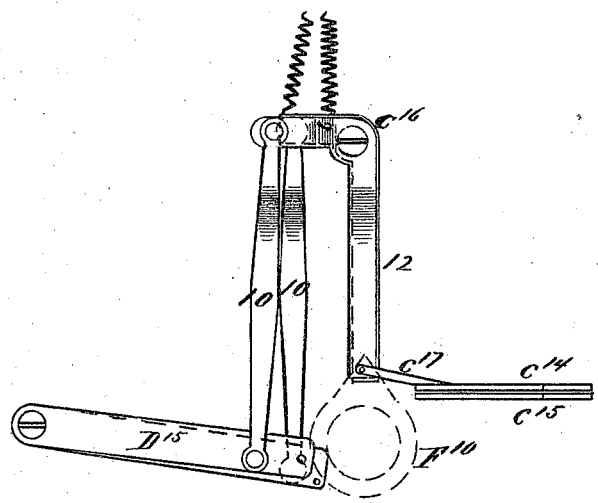
Figure 24:
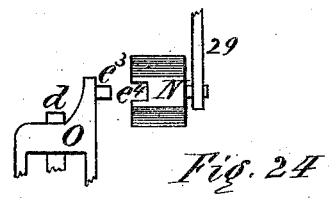
Figure 25:
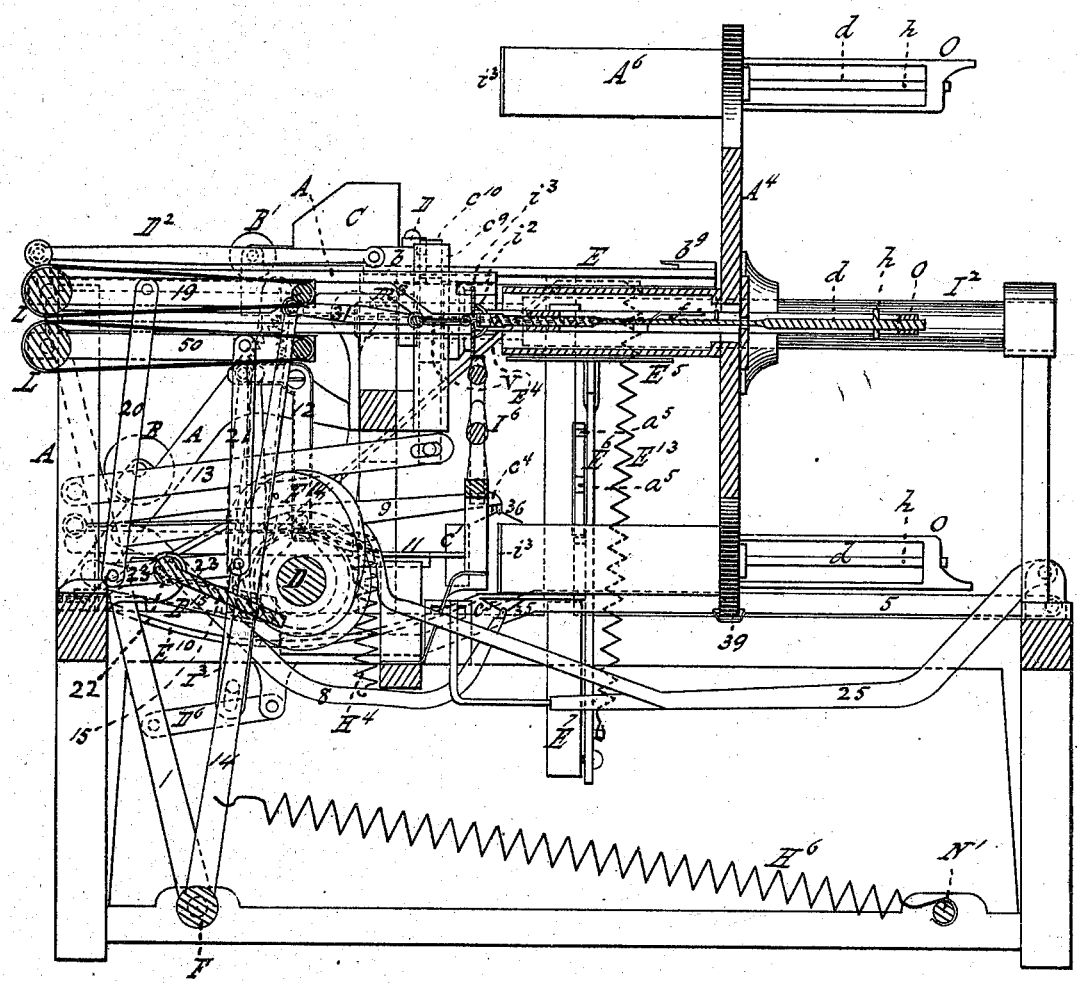

Figures 1 and 2 constitute a plan view of my invention. Figs. 3 and 4 constitute a front view of the same. Figs. 5 and 6 constitute an end view of the same. Fig. 7 is a side view of the mechanism which operates the bar and fingers which draw the paper in position to be cut and folded. Figs. 8, 10, and 12 is a side view of the mechanism which operates to open and close the fingers which draw the paper in place, enlarged to twice the size shown upon the other sheets of the drawings. Figs. 9, 11, and 13 is a plan view of the same. Fig. 14 is a reverse plan view of the bar and fingers which operate to draw the paper in place. Fig. 15 is a rear view of the step upon which the former rests, and which, with the former, holds the paper in place while the latter is being folded lengthwise, and of the mechanism which operates the step. Fig. 16 is a reverse plan view of the same. Fig. 17 is a reverse plan view of the table upon which the paper is placed before being folded, and of the folders which fold the paper lengthwise to form the bag, and the mechanism which operates them. Fig. 18 is a plan view of the two side folders which fold the paper upon two sides of the end of the bag, and the mechanism which operates them. Fig. 19 is a side view of the upper and lower folders which fold the paper upon the other two sides of the end of the bag, and of their operating mechanism. Fig. 20 is an end view of the blade which assists in folding the bag flat when removed from the former, and of its operating mechanism. Fig. 21 is a plan view of the piston, and details of its mechanism, which operates to remove the bag from the former and fold it preparatory to packing it for shipment. Fig. 22 is a longitudinal section of the same through line P. Fig. 23 is a side view of the plungers which operate to apply the paste to the paper in folding and forming the end of the bag, and the mechanism for operating the same; and Fig. 24 is a plan view of the sliding block which operates the frame and piston or rod within the former. Fig. 25 is a vertical section on line $V^4$ of Fig. 2. Fig. 26 is a vertical section on line $V^5$ of Fig. 2, and Fig. 27 is a vertical section on line $V^3$ of Fig. 3.

My invention relates to a machine for making paper bags; and it consists, first, of two parallel reciprocating bars provided with fingers, one of which bars is made to turn slightly in its bearings at each end by means of two fixed latches, or inclined pieces which are attached to the frame, through and beneath which latches a small pin passes, which is attached to a swinging piece hung upon the lower moving bar, by means of which the fingers are opened and closed, operating, as the said bars reciprocate, to draw the paper from its roll through cutting-bars provided with presser-plates, whereby the paper is cut into suitable lengths and placed upon a table in proper position to be folded. It also consists of a disk or wheel, upon which are secured any even number of formers, said wheel or disk being made to make a certain number of intermittent rotary movements in each revolution equal to the number of formers attached thereto. These formers, as the disk is rotated, pass down in succession through an opening in a table, upon which the sheets of paper are laid when cut, and a reciprocating adjustable step is arranged beneath the table to move up against the descending former, automatically adjusting itself thereto, and holding the paper in place, while two folders, moving beneath the table in a horizontal direction, operate to fold the ends of the paper over the former as the latter descends, and one edge of the paper having had paste or other adhesive substance applied thereto as it passed onto the table, the edges of the paper are thus stuck together. My invention also consists of a set of plungers, arranged to move up against the paper at the end of the former in connection with the folders which fold the paper over its end, and deposit the adhesive material upon the paper, the said material having been left upon the plungers by suitable transfer-rolls, which take the adhesive material from its receptacle; and after the material has been left upon the paper, the folders, actuated by levers, move up and fold the paper over the end of the former, one folder being at each side of the former, at the end thereof, and also one above and one below. It also consists of a moving frame, operating through and inside of each former, said frame being provided with folding wings or plates, hinged or pivoted to the end of the frame, and which are operated in their folding movement by a curved piece attached to each wing or plate, and extending through a recess or hole made in the piston at the end of a rod moving within the frame, which rod is limited in its longitudinal movement by a shoulder or projection upon the rod. Two bent arms also move out from the frame in a lateral direction by means of a cam or incline placed within the former, along which the inner end of each lever slides in its outward movement; and the arms are caused to move back into place again by the bent part of each arm striking against the inside of the former, at the end, as the frame is being drawn into the former. And it also consists of a reciprocating blade, which is made to move up to the end of each former as it moves into the proper position, to assist in removing the manufactured bag from its former, and in folding the same flat preparatory to shipment. And it further consists of two endless aprons or bands, carried by rollers, which are set in vibrating frames, which are moved apart at one end to permit the bag to be placed between them by the mechanism which removes the bag from the former; and the vibrating frames are then brought together, so that the bag is caught between the endless aprons and carried off, when they are finally packed or arranged for shipment.

That others skilled in the art may be able to make and use my invention, I will proceed to describe its construction and operation.

In the drawings, A represents the frame, which supports the operative parts of the machine, and upon which is secured an additional frame, $A^1$, in which the roll B has its bearings, as also another roll, $B^1$, to each end of which is pivoted the lowest of two plates, $B^{11}$, the upper one resting upon the lower one, and being held in position by any suitable means, and both plates rest upon a small projection standing out upon the frame C. $C^2$ represents a knife, pivoted at each end to the cross-head C, and a projection, $B^{17}$, is made upon the knife $C^2$, so that when said knife is forced upward the said projection impinges against the plates $B^{11}$ and forces them upward also. The shaft $D^1$ has its bearings at each end in the frame A, and upon this shaft are fixed the cams which give movement to the different levers and other operative parts of the machine, and which I denominate the cam-shaft. A bent lever, 4, has its end pivoted to the frame A, and the cam $F^4$ causes said lever to move upward to operate the knife $B^3$ and the plates $B^{11}$ at the proper time. In the top of the frame $A^1$ are made horizontal grooves $b^1$, shown in Fig. 7, one in each side, and the blocks $b$, which are connected by the cross-bar D, are made to slide in said grooves, causing the cross-bar D to make a horizontal reciprocating movement by means of the cams $F^1$ and $F^2$, and the levers $B^4 D^6$, 1, and $D^2$ connected therewith. The cross-bar D is provided at proper intervals with the fingers $b^2$, and directly beneath said bar is another bar, $b^3$, shown in Figs. 10 and 14, which is also provided with fingers $b^4$, located directly beneath the fingers $b^2$, and the bar $b^3$ has its bearings at each end in the blocks $b$, so that it may turn freely therein, and a spiral spring, $b^{18}$, attached to the bar $b^3$ with its ends secured, causes said bar to have a tendency to revolve, and bringing the ends of the fingers upon both bars together, as shown clearly in Fig. 10. At one end of the bar $b^3$ is a piece, $b^8$, arranged to swing loosely thereon, and which is provided with a pin or projection resting upon another piece, $b^{12}$, which latter is firmly secured to the bar $b^3$, so that the loosely-swinging piece $b^8$ may be raised without moving the bar $b^3$; but if the piece $b^8$ be depressed at its free end it will force down the end of the piece $b^{12}$, causing the bar $b^3$ to turn slightly in its bearings, and causing the fingers $b^4$ and $b^2$ to open. Attached to the frame $A^1$ at one side is a piece, $b^6$, its outer end being somewhat elevated from the frame, allowing a little space between the end of said piece and the frame, and the piece has also a notch, $b^7$, made therein. This piece $b^6$ is located at the end of the cross-head C, as shown in plan in Fig. 1. A piece, $b^9$, shown in Figs. 12 and 13, is also attached to the frame $A^1$, the end of said piece being slightly turned upward, and a little elevated above the frame, and is also provided with a notch or recess, $b^{10}$. This piece is located opposite the piece $b^6$, and at the rear end of the frame $A^1$, to which latter upon the top is fixed a table, E, having an opening, $A^5$, therein. As the reciprocating bar D approaches the cross-head C the projection $b^5$, shown in Fig. 11, passes under the end of the piece $b^6$, and the piece $b^{12}$ being thus forced down the bar $b^3$ is turned in its bearings and the fingers are opened. As the projection $b^5$ passes to the notch $b^7$ it moves up through said notch, and the fingers are quickly closed by the action of the spring. As the bar recedes from the cross-head C and approaches the rear side of the table the projection $b^5$ passes under the end of the piece $b^9$, opening the fingers, as before, and, passing up through the notch $b^{10}$, the fingers are closed, as before. The two arms, 1, one attached to each piece $b$, and the lower ends to the rock-shaft F, cause the bar D to move easily and parallel with the cross-head C. To the lower side of the table E are fixed ways $a^1$ in which move the pieces $a$, to which are attached the folders $E^1$ and $E^{11}$, and the levers $E^3$ and $E^4$ are pivoted to a cross-bar at $a^3$, one end of said levers being attached to the pieces $a$. The lower end of the lever $E^3$ is caused to vibrate laterally by the cam $F^3$, and that of the lever $E^4$ by the cam $F^4$. The vertical ways $E^7$ are secured to the frame beneath the table E, in which ways moves the piece $E^{14}$, to which is pivoted the vibrating rod $E^6$, which is provided with a pin or projection, $a^6$, shown in dotted lines in Fig. 15, and to the upper end of said rod is pivoted a plate or step, $E^5$, which is kept in a horizontal position by a small spring.

The piece $E^{15}$, shown in Fig. 15, is attached to the frame A, and has an oblique groove, $a^5$, made therein of sufficient size to permit the pin $a^6$ to slide freely therein, and projection $a^7$ may be made upon the part $E^{15}$ to serve as a stop against which the pin $a^6$ may strike to limit the upward movement of the rod $E^6$. This upward movement of said rod may be given by a cam or by a spring, $E^{13}$.

The lever E, shown in detail in Figs. 15 and 16, may be pivoted to the frame A, and is operated to move its free end in a lateral direction against the rod $E^6$ by means of a cam, $E^9$, upon the shaft $D^1$. As thus arranged the rod $E^6$ may be forced down in a vertical direction until the pin $a^6$ reaches the lower edge of the part $E^{15}$ when the cam $E^9$ moves the end of the arm $E^{10}$ against the rod $E^6$ and forces that along the face of the part $E^{15}$, the pin $a^6$ moving against the lower edge of said part until it reaches the oblique groove $a^5$, when the pin enters said groove, and the spring $E^{13}$ moves the rod $E^6$ upward, the pin moving in said groove and out at its upper end against the stop $a^7$, when it may be moved down again in a vertical direction, as before. 7 and 11 represent two folding-levers—the one, 11, pivoted at one end to the frame A, and the other, 7, pivoted to a piece, G, which slides to and fro in guide-ways made upon the frame A, as shown in Fig. 3, and to the free end of said levers are pivoted the plates $c$ and $c^1$. A lateral movement is given to the lever 7 by the cam $F^7$, and a lateral movement is given to the lever 11 by the cam $F^9$, and a longitudinal movement is also given to the lever 7 by means of the cam $F^8$, and the arm $G^1$ hung upon the rock-shaft F. By this arrangement, after the arm 7 has been caused by the cam $F^7$ to move its folder $c$ toward the former in a lateral direction and back again, it is also caused to move back in a longitudinal direction, so that its folder or plate $c$ may be withdrawn and not interfere with other working-parts of the machine, as will be more fully explained hereafter. 8 represents an arm, pivoted at one end to the frame, and to the other end is pivoted a folder, $c^5$, which is caused by a spring to assume the position shown in Fig. 19, and upon this folder is made a wing, 35, extending at about a right angle from the folder, so that when the cam $F^9$, by operating the lever 8, causes the folder to move up against the former the wing 35 first strikes against the lower side of the former, and the end of the lever continuing to move up the folder is tilted upon its pivot up against the end of the former. 9 represents a lever, also pivoted at one end to the frame, and to the other end is pivoted the folder $c^4$, having a similar wing, 36, to that just described, so that when the cam $F^9$ operates the lever the wing first strikes the upper side of the former, and the folder $c^4$ is tilted upon its pivot and brought against the end of the former. In the drawings the cam is represented as operating the levers to throw the folders away from the former, while a spring, $H^4$, is employed to bring them against the former; but, in practice, the cam, by having a groove therein, would operate the levers 8 and 9 in both directions. Two arms, $D^{15}$, are pivoted at one end to the frame, and are also connected by the rods 10 to the bent levers 12, the ends of the latter being connected to the plungers $c^{14}$ and $c^{15}$, which slide to and fro in suitable guides. The cam $F^{10}$, by depressing the free ends of the arms $D^{15}$, causes the bent levers 12 to turn slightly upon their pivot $c^{16}$, and the plungers $c^{14}$ and $c^{15}$ are forced outward. The cam operates to throw first one of the plungers outward and then the other, for a purpose which will be hereafter explained. A box is placed beneath said plungers in a convenient position, with rolls placed therein, said box containing paste, or adhesive material, and suitable rolls are attached to the end of the rod $I^1$, which is hung to the frame, which rod is operated by a cam, operating to carry the adhesive substance from the box containing it up to the plungers $c^{14}$ and $c^{15}$ and depositing it upon their edges and ends. A shaft, $I^2$, has its bearings, one end in the frame A at the rear side of the machine, and the other end in the post $c^8$, shown in Fig. 3, and upon said shaft is placed, to turn freely thereon, a toothed wheel, $c^{12}$, and also a collar, $c^{11}$, which is keyed to the shaft in such a manner that it cannot turn thereon, but yet so that it may slide a little along the shaft, and said collar is held against the toothed wheel by the spring $x^1$. A vertical guide, $c^9$, is secured to the frame, in which slides a rack, $c^{10}$, the teeth of which engage with those of the wheel $c^{12}$, and which is caused to make a reciprocating vertical movement by means of the arm 13, one end of which is pivoted to the frame, and which is operated in a vertical direction by the cam $F^{13}$. The collar $c^{11}$ is provided with any even number, say four, ratchet-notches, $x$, and the toothed wheel $c^{12}$ is provided with a projection, which, when said wheel is rotated in one direction, engages with the shoulder of the notches $x$, and the collar and shaft $I^2$ are both rotated; and when the motion of the toothed wheel is reversed the projection, moving against the inclined part of the notches, merely forces the collar away from said wheel. Any equivalent ratchet movement, however, will answer the same purpose. To the shaft $I^2$ is firmly secured a disk, $A^4$, having in its periphery a number of notches, $x^3$, equidistant from each other, and equal in number to those notches in the collar $c^{11}$. Upon the inner face of the disk $A^4$ are the prismatic formers $A^6$, equidistant from each other, and the same in number as the notches $x$, and each former is provided with a frame, O, which moves longitudinally in ways or guides within the former; and upon each side of said frame is an ear, $e^2$, to which is pivoted a bent arm, $f$, the inner end having a projection, $e^1$, thereon; and the frame O has a longitudinal opening in each side, into which the outer end of the bent arm moves when the frame is drawn into the former by means of the bent part $f$ of said arms striking against the inside of the end of the former. The former has two inclines or fixed cams, $e$, on the inside, one on each side, against the inclined part of which the projection $e^1$ strikes when the frame O is moved outward, which causes the bent arms $f$ to be thrown out from the frame in a lateral direction. Having a bearing in the frame near each end, and sliding longitudinally therein, is the rod $d$, which is enlarged at the end, having two projections, $i^1$ and $i^6$, on each side, with a space or recess, $i$, between. The folding wings or plates $i^3$ are hinged to the end of frame at $i^4$, and upon each plate is made the curved piece $i^2$, the end of which is inserted in one of the recesses $i$, and a spring, $n$, is secured to the frame O, which bears upon the exterior surface of the curved piece $i^2$, which is attached to that plate which is uppermost when the frame is forced out from the former to prevent the weight of the plate $i^3$ from drawing said curved piece entirely out of the space between the side projections $i^1$ and $i^6$; and the rod $d$ is provided with two other projections, one at $h$, near the rear end, and one nearer the middle at $h^1$.

If the frame O be in position within the former, and the frame be moved out, the rod $d$ moves with the frame until the rear projection $h$ strikes against the rear face of the disk $A^4$, when the outward movement of the rod will be stopped. As the frame is moved a little farther outward the folding-plates $i^3$ are moved away from the rod $d$, and the interior curved surface of each piece $i^2$ strikes against the projection $i^6$, causing the plates $i^3$ to turn upon their pivots $i^4$ and fold together at the moment the frame has attained the limit of its outward movement, and at the same time the projections $e^1$ strike the inclines $e$, and the arms $f$ are thrown outward in a lateral direction, as shown in Fig. 21. If the frame be drawn into the former, the rod moves with it until the projection $h^1$ strikes against the front face of the disk $A^4$, and the rod stops its inward movement. The frame being moved still farther in, the pivoted plates $i^3$ are brought in toward the rod $d$, and the exterior curved surface of each piece $i^2$ strikes against the projection $i^1$, and the curved pieces, thus turning through the recesses $i$, cause the plates to assume a position at nearly right angles to the rod $d$, and conforming to the shape of the outer end of the former. A lever, 18, is pivoted at one end to the frame $A^7$, which is an addition to the frame A, and is caused by the cam $F^{17}$ to vibrate to and fro, giving the rod 26 and rock-shaft $N^1$, through the arm 16, a reciprocating rotary movement. The arm 28, being attached to said rock-shaft at one end, and to the block N through the short arm 29 at the other end, gives the block N a reciprocating movement along the bar K. The block N has a recess, $e^4$, therein, and each frame O, of which there is one to every former, has a projection, $e^3$, thereon, which, at each intermittent rotary movement of the disk $A^4$, moves into said recess $e^4$, when it stops until the block N has been moved forward and back again, carrying the frame O partially through the former and back to its position again, when the block is in position to receive the projection on the next approaching frame O. An arm, $I^3$, is pivoted to the frame $A^7$, and said arm is connected with another arm, 14, of which there are two, and both attached at their lower ends to the rock-shaft F, and at their upper ends to two shorter horizontal arms, 31, which are connected with and give a reciprocating movement to a blade, V. This blade has four bearings, $m$, two at each end, shown in Figs. 2 and 20, which slide in ways $m^1$ and $m^2$ made on the inside of the two top pieces of the frame $A^7$, shown in Fig. 20. These ways, which are located one above the other, are connected one with the other in two places, as shown clearly in Fig. 20, and at one of the points of connection a pivoted piece or latch, $m^3$, is hung, one on each side, so that as the bearings of the blade slide back in a horizontal direction they strike against the lower ends of the pivoted pieces, raising them up, and, after the bearings have passed, the pivoted pieces drop again to their former position. As the bearings move back again the lower end of the pivoted pieces being in an inclined position in front of the bearings, they slide up over said pivoted pieces into the upper ways, and thence down again through the two inclines at $m^8$ to the lower ways $m^2$. The object of this movement of the blade is to permit the blade to assist in removing the bag from the former and in carrying it forward to the endless aprons, which finally remove the bags from the machine, and also that the blade may be removed out of the way of said aprons as the latter close together to seize the bag. The blade is made to make a reciprocating movement by means of the cam $F^{13}$ upon the cam-shaft $D^1$ operating upon the arm $I^3$ and its connections 14 and 31. Two rolls, L, have a bearing in the uprights $A^8$, shown in Fig. 4, and to the journals of said rolls are loosely fixed two side pieces, 19, one at each end of the roll, shown in Fig. 2, and in the other ends of said side pieces the rolls $L^2$, having their bearings, and around the upper rolls L and $L^2$ extends an endless apron, $L^1$, a similar apron extending around the two lower rolls, and both aprons passing in very close proximity to each other, two side pieces, 50, serving for the bearings for the lower set of rolls. A small rock-shaft, 22, is pivoted in the frame A, shown in Fig. 4, to which rock-shaft is fixed a piece, 15, and two horizontal bars, shown in dotted lines in Fig. 2, and numbered 23, are fixed to said rock-shaft, and to one end of said bars are attached the upright bars 20, and to the other end the upright bars 21, the upper ends of the bars 20 being attached to the upper side pieces 19, and the upper ends of the bars 21 to the lower side pieces 50, so that as the cam $F^{15}$ operates to depress the end of the piece 15 the pieces 23 are tilted by the rock-shaft 22, and the bars 20 are raised, elevating the inner ends of the upper side pieces 19, and the bars 21 are drawn down, depressing the inner ends of the lower side pieces 50, both sets of side pieces 19 and 50 pivoting on the bearings of the two rolls L, so that by this movement the two endless aprons $L^1$ are opened at their inner ends to permit the bag to pass in between them, and are closed again upon the bag, which is carried out of the machine by the rapid revolution of the aprons, which revolution may be given by a band passing around one of the journals of the rolls L, and also around a pulley upon the shaft $D^1$. In most cases when a spring is used to give motion to a lever or an arm in connection with a cam, as shown in the drawings, it has been done more for convenience in this description; but in practice the same movement could be attained by making the cam grooved to move the lever or arm in both directions. The periphery of the disk $A^4$ is provided with a number of notches, 37, equidistant from each other, and equal in number to the formers upon the disk, and a spring-detent, 39, is pivoted at one end to the frame A, the other end having a short projection thereon, which springs into one of the notches 37 as the disk revolves, stopping the disk and securing it in that position until the cam $F^5$ operates to depress the arm 5, which rests upon the spring-detent 39, and is pivoted at one end to the frame A, as shown in Fig. 1, when the detent 39 is thereby forced out of the notch 37, and the disk is free to rotate until the next notch reaches the detent, and so on.

The operation of my invention is as follows: The paper being wound in a continuous sheet upon the roll B, the end is passed between the plates $B^{11}$, and beneath the cross-head C, between it and the knife $C^2$, and after the latter has been forced up by the cam $F^4$ and arm 4 the end of the paper is then straight. As the shaft $D^1$ revolves the bar D with its fingers approaches the cross-head C, being operated in that movement by the cams $F^1$ and $F^2$ and the connecting-arms, and the piece $b^6$ causes the fingers to open just as they approach the end of the paper which lies between the knife and the cross-head. As they close quickly they seize the end of the paper, and as the bar D recedes again it draws the paper through between the plates, which serve to keep the paper flat and smooth while being cut, and beneath the cross-head the proper distance, when the bar D stops, and the knife $C^2$ and plates also being forced up by the cam $F^4$, the paper is held flat by the plates and is cut off by the knife. The bar D, with its fingers still clasping the paper, recedes a little farther until the small pin $b^5$ passes under the piece $b^9$, whereby the fingers are opened and the paper is dropped into its position upon the table E. The disk $A^4$ is caused to make its intermittent rotary movements by means of the cam $F^{13}$, which raises the arm 13, and through that the toothed rack $c^{10}$, to which it is connected. This gives the toothed wheel $c^{12}$ a reciprocating rotary movement, in every alternate movement of which the pin upon said toothed wheel engages with the ratchet-collar $c^{11}$, which revolves the shaft $I^2$ and disk $A^4$. As the disk revolves one of the formers $A^6$ thereon passes down, approaching the opening $A^5$ in the table, across which the paper is laid; and the step $E^5$ also passes up toward the opening and meets the former at the opening, adjusting itself to the lower side of the former, with the sheet of paper between. As the former $A^6$ passes down the folders $E^1$ and $E^{11}$, being separated to allow the former and paper to pass between them, press against the paper and former, and as the upper surface of the former reaches a position upon the same horizontal plane with the lower side of the folders the detent 5 springs into one of the notches 37 of the disk and stops it. The folders $E^1$ and $E^{11}$ then pass partially over the side of the former which is then uppermost, one a little in advance of the other, meeting each other in the middle, and, one of the edges of the paper having had paste or some adhesive substance applied thereto while being drawn upon the table, the edges of the paper are pressed together upon the former by one of said folders, which remains upon the lapped edge of the paper until the disk is ready to start again in its revolution, which insures the proper adhesion of the folded or lapped edges of the paper. As thus folded around the former, the end of the paper projects a little beyond the end of the former to be folded thereafter. The detent being again withdrawn from its notch in the disk, the latter makes another rotary movement, the lever $F^{10}$ meanwhile being caused, by its cam, to push the upright bar $E^6$, having the step $E^5$ thereon, to one side, its pin or projection $a^6$ passing along beneath the edge of the part $E^{15}$, and entering the oblique groove $a^5$, and passing up as before. At the next rotary movement of the disk, the former which has been in position just beneath the table E, having the paper folded upon it longitudinally, is carried down in front of the plungers $c^{14}$ and $c^{15}$, and here the rollers upon the end of the arm $I^1$ having passed up and applied the adhesive material to the ends and the sides of the plungers, the arm 9 passes down the wing 36, strikes against the upper side of the former, bringing the folder or plate $c^4$ up against the end of the former, and thereby turning down one flap of the paper over the end of the former. One of the plungers $c^{14}$ is then forced forward by the action of the cam $F^{10}$, and connecting-arms 10 and 12, and adhesive material is thereby deposited upon that part of the paper just turned down over the end of the former. The arm 8 then moves up, and the wing 35 of the lower folder strikes against the lower side of the former, which brings the said folder $c^5$ up against the end of the former, folding the lower flap of the paper against the end of the former, and at the same time the arms 7 and 11 move up sufficiently to press the side flaps slightly inward while the lower plunger $c^{15}$ is being forced in, depositing adhesive material upon the flaps already folded in, and also upon the inside of the side flaps, they being pressed in just sufficient to receive the adhesive material from the edges of the lower plunger $c^{15}$. As soon as the lower plunger is withdrawn, the side folders finish their inward movement, and the folding of the paper over the end of the former, forming the end of the bag, is completed. The arms 7 and 11 then move back to their places, and as the arm 7 recedes in a lateral direction, it also moves back in a longitudinal direction, by the piece G in Fig. 3 moving back in its ways in the frame, said piece being operated in that movement by means of the cam $F^8$ and the arm $G^1$. This longitudinal movement of the arm 7 is for the purpose of bringing the end of said arm, and the folding-plate $c$ attached thereto, back out of the way of the next former, as it comes into position in front of the plunger to have the end of the paper which is thereon folded, and when the said former has passed into that position the arm 7 is moved forward again by the same means. At the next rotary movement of the disk $A^4$, the end of the bag is preserved in its folded form by the radial rollers $I^6$ set in the frame $I^5$, against which the end of the bag passes as it moves past them around into place to have the bag removed. As the former moves into the last position mentioned—viz., to have the bag removed from the former—the projection $e^3$ on the end of the frame O, passes up into the recess $c^4$ in the block N. The cams $F^{17}$ and $F^{16}$, together with the arms 18, 16, and 26, cause the rock-shaft $N^1$ to partially rotate, and the arms 28 and 29 carry the block N along upon the piece K, causing the frame O to move lengthwise through the former $A^6$. As the pins or projections $e^1$ in the pivoted arms $f$ strike the inclines $e$ fixed within the former, the outer ends of said arms are thereby moved outward, they being pivoted at $e^2$, as shown in Figs. 21 and 22. The drawings on that sheet are drawn on a larger scale to show the former, the frame, and the details more plainly; and as the pin $h$ in the rod $d$ strikes against the rear face of the disk $A^4$, or the plate $h^2$ secured thereto, the rod is thereby stopped in its longitudinal movement, and as the frame O moves outward a little farther the hinged plates $i^3$ are carried outward also, and the inside of the curved pieces $i^2$ impinge against the part $i^6$ on the end of the rod $d$, and the folding-plates $i^3$ are thereby swung outward into the position shown in Fig. 22. When the frame O starts upon its outward movement the plates $i^3$ are in a position parallel with the end of the former, and the blade V, shown in Figs. 2 and 20, is moved along in the ways $m^1$, down the inclines $m^3$ into the ways $m^2$, by the levers I, 14, and 31, until the edge of the blade strikes against the end of the bag upon the former, and the blade then moves back in the ways $m^2$ as the frame O is moved out, with the bottom of the bag between the edge of the blade and the folding-plates $i^3$, the latch $m^3$ dropping back into place after the blade or its bearings has lifted and passed it. As the blade V starts to move back toward the former the rock-shaft 22, Fig. 4, is caused to partially rotate by the cam $F^{15}$ and arm 15, and the arms 20 raise the inner ends of the upper frame 31, which support the rolls L and $L^2$, carrying the upper endless apron, and the arms 21 depress the inner ends of the frame which carry the rolls and lower endless apron, so that the inner ends of both aprons are carried away from each other and the blade V passes in between them. At the most outward limit of the movement of the frame the plates $i^3$ are folded together, as before described, and the arms $f$ are thrown outward, and the aprons closing in against the end of the bag to crimp it, and the blade V receding a little farther back away from the plates the bag is folded quite flat. The arms $f$, being inside the bag, operate to throw out the sides and the plates to fold the bottom. The blade V is thus carried quickly forward again, passing up over the latch $m^3$ into the upper ways $m^1$ to pass by the bag, and the rock-shaft 22 and arms 20 and 21 bring the endless aprons together again, and the bag is carried quickly out by said aprons. After the bag is carried to the aprons and folded flat by the plates $i^3$ and arms $f$ the frame O is carried back into the former by the block N, and the bent parts of the arms $f$, as they pass into the former, strike against the sides thereof, and are thereby moved back into place, and as the projection or pin $h^1$ strikes against the inner face of the disk $A^4$ the rod $d$ is stopped in its inner movement; but the frame O moves in a little farther, which brings the outer or convex surface of the curved pieces $i^2$ against the part $i^1$ of the rod, and the plates are thereby folded into position parallel with the end of the former $A^6$.

It will be perceived that by this arrangement of a revolving disk with the former secured thereto, and a corresponding distribution of the folding mechanism, and with the frame and rod moving through the former, while one finished bag is being removed from the former another bag is being folded at the end, and still another is being folded lengthwise, while each one in its turn is removed from the machine folded flat ready for shipment, or for packing preparatory to shipment.

Having thus described my invention, what I claim as new, and desire to secure by Letters Patent, is—

1. The radially-arranged rolls I⁶ for preserving the folded end of the bag in its folded form while passing to its position to be removed from the machine, substantially as set forth.

2. As a means of operating the folding-plates $i^3$, the rod $d$, provided with projections $i^1$ and $i^6$ and $h$ and $h^1$, said rod sliding within the frame O, and the curved pieces $i^2$ upon said folding-plates, substantially as described.

3. The combination of the rod $d$ with the moving frame O, and the arms $f$ pivoted thereto, substantially as described.

4. In combination with the moving frame O and the folding plates $i^3$, the reciprocating blade V, substantially as set forth.

5. The endless aprons L¹ and L¹, carried by rolls having a stationary bearing at one end, and over rolls which move apart at the other end, substantially as described.

6. The combination of the vibrating endless aprons L¹ and L¹, with the longitudinally-moving frame O, substantially as set forth.

7. The combination of the vibrating endless aprons L¹ and L¹ and frame O, with the folding-plates $i^3$, and reciprocating blade V, substantially as described.

8. The spring $n$, in combination with the curved piece $i^2$, as a means of preventing the folding-plate $i^3$ from swinging open too far, substantially as set forth.

9. The combination of the rotating disk A⁴, formers A⁶, and the mechanism for removing the bag from the formers, substantially as herein described.

10. The frame O, provided with folding-plates and arranged to move longitudinally within the former, substantially as and for the purpose herein described.

11. The combination of the arms $f$ with the reciprocating blade V, operating substantially as and for the purpose herein described.

12. The combination of the arms $f$, reciprocating blade V, and vibrating endless aprons L¹, substantially as herein set forth.

13. A series of formers, A⁶, equidistant from each other, revolving around a common center and having a hinged or folding end, substantially as described.

14. The hinged or folding end former A⁶, in combination with the blade V, substantially as described.

GEORGE DUNHAM.

Witnesses:
T. A. CURTIS,
CLARENCE E. BUCKLAND.